(12) United States Patent
Ford

(10) Patent No.: US 9,370,166 B1
(45) Date of Patent: Jun. 21, 2016

(54) PET SAFETY VEST

(71) Applicant: Clifford Ford, Deltona, FL (US)

(72) Inventor: Clifford Ford, Deltona, FL (US)

(*) Notice: Subject to any disclaimer, the term of this patent is extended or adjusted under 35 U.S.C. 154(b) by 0 days.

(21) Appl. No.: 14/872,433

(22) Filed: Oct. 1, 2015

(51) Int. Cl.
*A01K 13/00* (2006.01)

(52) U.S. Cl.
CPC .................... *A01K 13/006* (2013.01)

(58) Field of Classification Search
CPC . A01K 13/006; A01K 27/006; A01K 27/002; A01K 27/008; A41D 13/01
USPC ......... 119/792, 850, 858, 859, 770, 907, 856; 2/102; 54/79.2
See application file for complete search history.

(56) References Cited

U.S. PATENT DOCUMENTS

| | | | | |
|---|---|---|---|---|
| 1,196,203 A * | 8/1916 | Borbridge | ............ | A01K 13/008 54/79.2 |
| 4,324,204 A * | 4/1982 | Friedman | ................. | A01K 1/04 119/771 |
| D281,028 S * | 10/1985 | Nichols | ......................... | D30/145 |
| D313,676 S * | 1/1991 | Indursky | ...................... | D30/145 |
| D363,572 S * | 10/1995 | Obenchain | ................... | D30/145 |
| 5,632,235 A * | 5/1997 | Larsen | ................. | A01K 1/0263 119/856 |
| D379,687 S * | 6/1997 | Curtis | .......................... | D30/144 |
| 5,970,921 A * | 10/1999 | Fulton | .................. | A01K 13/006 119/792 |
| 6,085,698 A * | 7/2000 | Klein | ...................... | A41D 13/01 119/859 |
| 6,119,635 A * | 9/2000 | Powell-Lesnick | ... | A01K 13/006 119/850 |
| 6,267,083 B1 * | 7/2001 | Chimienti | ............ | A01K 13/006 119/850 |
| D455,873 S * | 4/2002 | Constans | ...................... | D30/145 |
| 6,727,197 B1 * | 4/2004 | Wilson | ................. | G06K 19/041 174/117 F |
| 7,140,327 B2 * | 11/2006 | Morehead | ............ | A01K 27/006 119/856 |
| 7,318,393 B2 * | 1/2008 | Ayscue | ................ | A01K 27/006 119/859 |
| 7,370,608 B1 * | 5/2008 | Friedman | ............. | A01K 13/006 119/850 |
| 7,497,186 B2 * | 3/2009 | Dorton | ................. | A01K 13/006 119/72 |
| 7,918,192 B1 * | 4/2011 | Digh | .................... | A01K 13/006 119/850 |
| 8,627,788 B2 * | 1/2014 | Sebo | ..................... | A01K 13/006 119/792 |
| 2005/0217609 A1 * | 10/2005 | Dorton | ................. | A01K 13/006 119/792 |
| 2007/0272170 A1 * | 11/2007 | Milson | ................. | A01K 1/0353 119/850 |
| 2008/0077214 A1 * | 3/2008 | Stalick | ..................... | A61D 9/00 607/112 |
| 2008/0110414 A1 * | 5/2008 | Buehner | .............. | A01K 13/006 119/712 |
| 2010/0050958 A1 * | 3/2010 | Jackson | ............... | A01K 13/008 119/850 |
| 2013/0066409 A1 * | 3/2013 | Hilton | .................. | A01K 13/006 607/110 |

* cited by examiner

*Primary Examiner* — Yvonne Abbott-Lewis
(74) *Attorney, Agent, or Firm* — Jason T. Daniel, Esq.; Daniel Law Offices, P.A.

(57) ABSTRACT

A pet safety vest includes a main body having a plurality of surfaces, a collar section, a middle support member and a pair of hind leg straps. The main body includes decorative elements and is reversible in nature. A plurality of light strips are located along the main body and are controlled by a central control unit having a processor and battery. A remote operation unit controls a lighting effect of each of the light strips remotely. The pet safety vest also includes a central pocket area having a removable cool pack disposed therein.

16 Claims, 5 Drawing Sheets

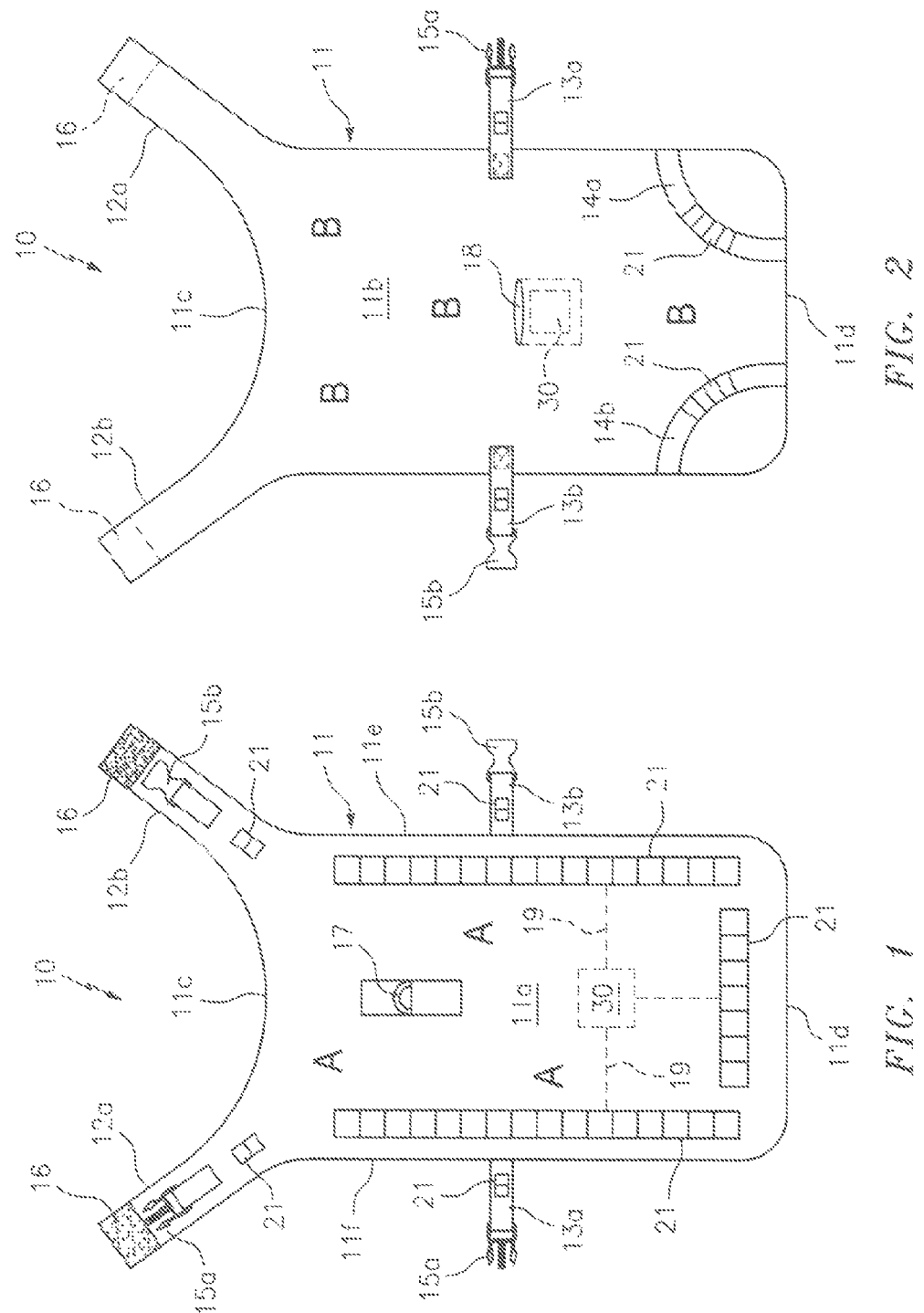

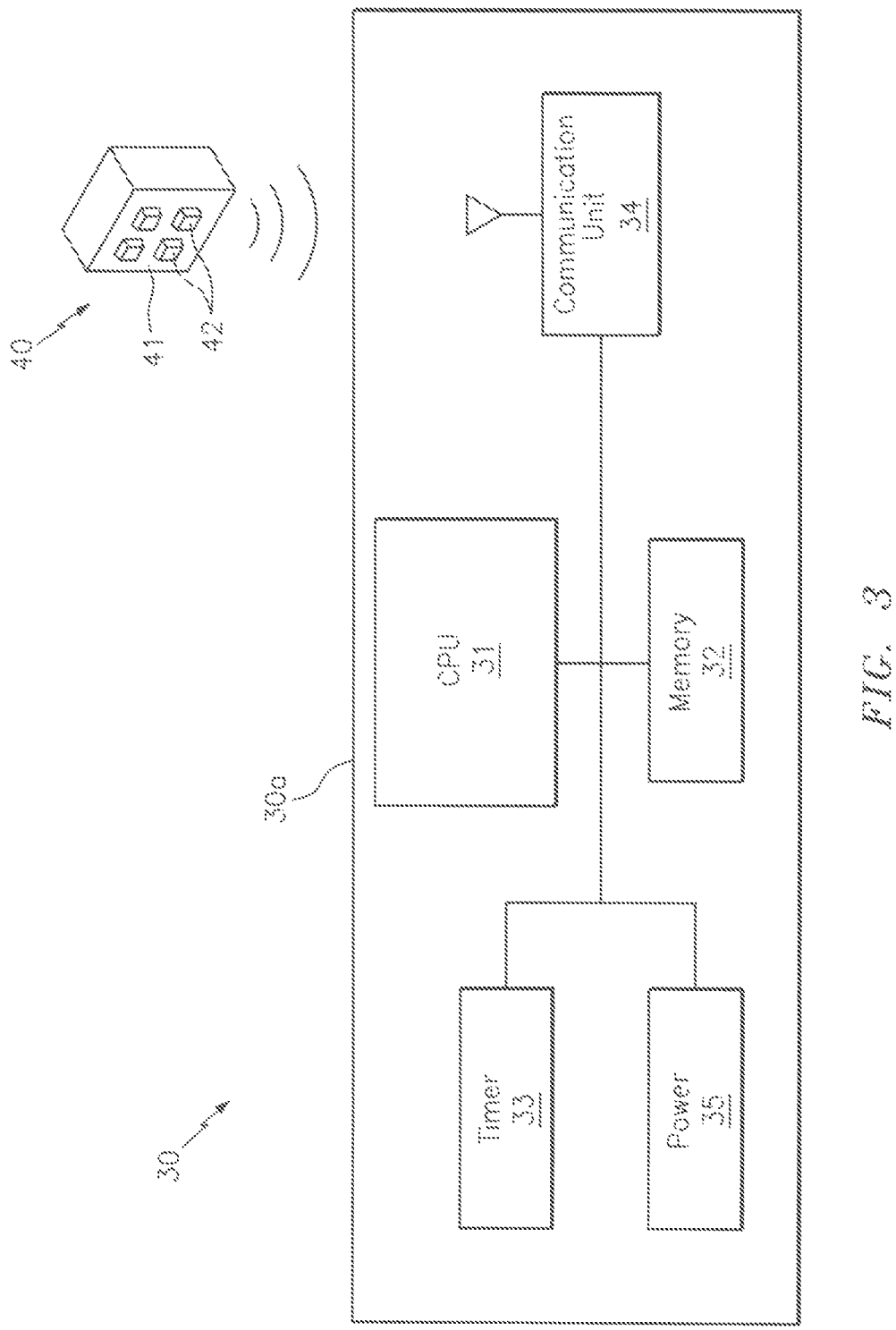

PET SAFETY VEST

TECHNICAL FIELD

The present invention relates generally to pet products, and more particularly to a safety vest for canines and other animals that can provide illumination in dark environments.

BACKGROUND

The statements in this section merely provide background information related to the present disclosure and may not constitute prior art.

Responsible pet owners often walk their pets to local parks and other recreational areas. Upon arrival, many dog owners will unleash their animals in order to allow them to run freely and play with other pets. To this end, identifying a particular dog from a distance can sometimes prove to be a difficult and time consuming task, especially if the dog does not respond to verbal commands to return to its master.

In addition to the above, many pet owners walk their dogs before and/or after work each day. As such, it is not uncommon for a portion of this daily routine to occur at night, or in a semi-dark environment. Although the owner may carry a flashlight or wear a reflective vest so as to be clearly visible to passing vehicles, the dog is afforded no such protection. As such, if the owner is not careful, the dog may wonder into the path of an automobile or stray too far away to be easily found.

Accordingly, it would be beneficial to provide a pet safety vest for canines and other such animals that is lightweight and easy to manufacture, and that can allow the pet to be quickly identified at day or night.

SUMMARY OF THE INVENTION

The present invention is directed to a pet safety vest. One embodiment of the present invention can include a main body that is designed to cover the backside of a pet such as a canine. The main body includes a collar section, a middle support element and/or a pair of hind leg straps. The main body can be adorned with any type of decorative elements and can be worn inside out or outside in. In one embodiment, a plurality of light strips can be located along portions of the vest. The light strips can generate any type of color, and can be controlled by a central control unit having a processor and battery.

Another embodiment of the present invention can include a remote operation unit that can control a lighting effect of each of the light strips remotely. Yet another embodiment of the present invention can include a central pocket area having a removable cool pack disposed therein. The cool pack can conform to the contour/shape of the pets' back, in order to impart a cooling effect onto the animal.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

FIG. 1 is a plan view of an outside facing surface of the pet safety vest, in accordance with one embodiment of the invention.

FIG. 2 is a plan view of an inside facing surface of the pet safety vest, in accordance with one embodiment of the invention.

FIG. 3 is a simplistic block diagram illustrating one embodiment of the control unit of the pet safety vest, in accordance with one embodiment of the invention.

DETAILED DESCRIPTION OF THE INVENTION

Figure 4:
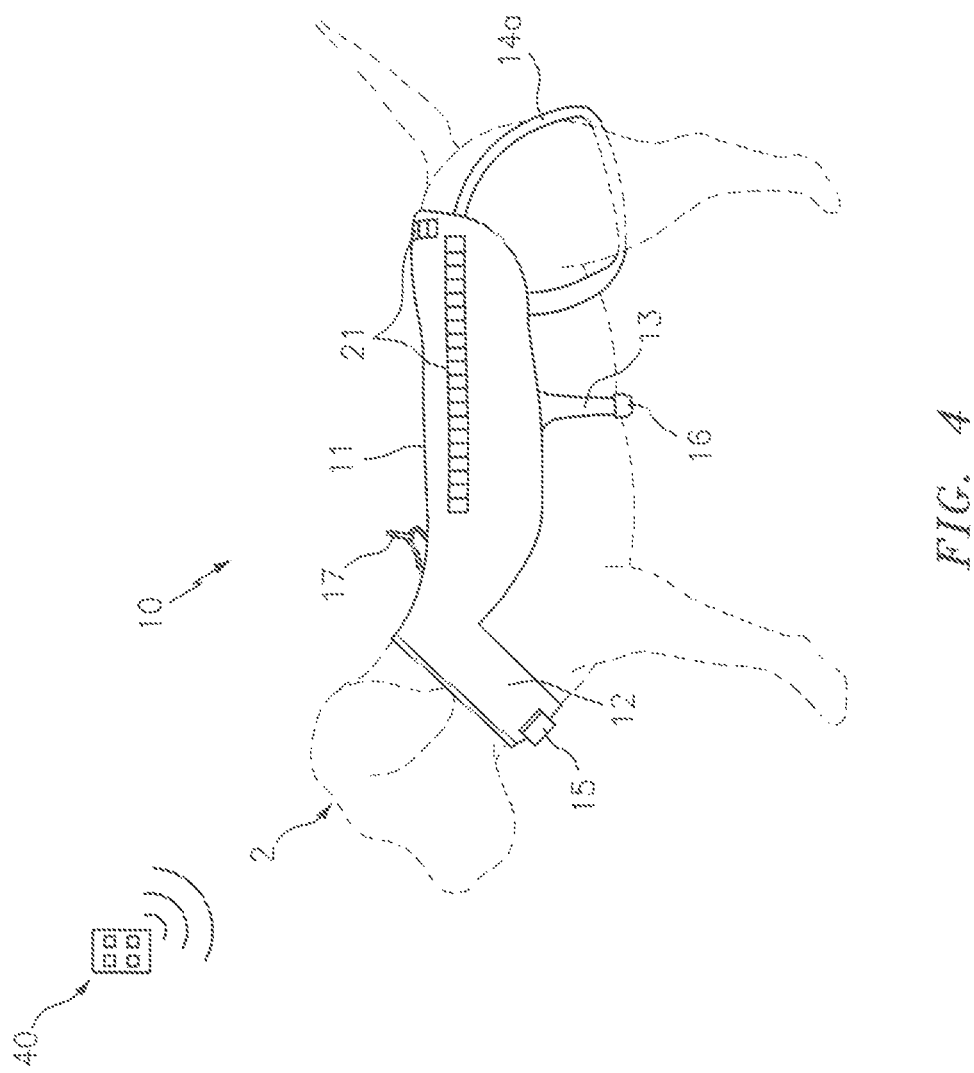
FIG. 4 is a perspective view of the of the pet safety vest in operation, in accordance with one embodiment of the invention.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

FIGS. 1-5B illustrate various embodiments of a pet safety vest 10 that is useful for understanding the inventive concepts disclosed herein. Although described and illustrated for use with canines, those of skill in the art will recognize that the inventive concepts can be augmented without undue experimentation to conform to the shape and size of any type of animal. As such, the inventive concepts disclosed herein are not limiting solely to canines.

As shown best in FIGS. 1 and 2, the vest 10 can include a main body 11 having an outside facing surface 11a, an inside facing surface 11b, a contoured top end 11c, a bottom end 11d and a pair of sides 11e and 11f. The main body can be manufactured in various shapes and dimensions so as to fit pets of any size and breed.

In the preferred embodiment, the main body 11 will be manufactured from a lightweight breathable and UV resistant material such as cotton coated with UV retardant spray or a moisture wicking material such as Sunbrella®; however any number of other known materials such as vinyl, nylon and cotton, for example, are also contemplated. In various embodiments, the main body can further include any type of lightweight padding and/or insulating material which can be disposed between the inside and outside facing surfaces of the main body. Such materials can provide additional comfort while the device is in use and offer warmth to the animal in cold weather situations.

In various embodiments, the main body can further include a collar 12 defined by collar sections 12a and 12b, a middle support 13 defined by support elements 13a and 13b, and a pair of elastomeric leg loops 14a and 14b. Each of the collar sections 12a-12b, and the middle support elements 13a-13b can be constructed from the same material as the main body, and/or from any type of reinforced material such as nylon, for example. As shown, each of these elements can further include one or more connectors such as a clip 15a and buckle 15b (referred to herein collectively as 15), and/or opposing strips of hook and loop material 16, respectively. Each of these elements can function to removably secure the collar and middle support elements about the neck and midsection of the animal at a tightness level that is comfortable to the pet.

Although described above with respect to particular connectors, the vest is not limited thereto, as the term connector can include any type of device that is capable of repeatedly securing the respective elements together in a non-permanent manner (i.e., removably secure). Several additional examples include, but are not limited to buttons, snaps, zippers, and/or opposing magnetic elements, for example.

In one embodiment, the vest can also include a leash attachment unit 17 which can be positioned along the outside facing surface 11a of the main body. As shown, the attachment unit can include a ring, loop or other such device that is capable of engaging the clasp of a pet leash (not illustrated). In this regard, the attachment unit can operate in conjunction with the collar sections, the middle support elements and/or the elastomeric leg loops to transition the safety vest into a pet harness. Such a feature can alleviate the need for the animal to wear a separate collar and/or harness along with the vest. Of course, each of these elements can be worn and/or utilized together in any combination.

As will be apparent, the safety vest can include any type of decorative elements A and B along any surface thereof. Each of these decorative elements A and B can include an unlimited number of colors, markings, words, shapes, symbols, logos, designs, types of materials, texturing of materials, patterns, images, photographs and/or jewels, for example. These elements can be secured onto and/or into the vest in accordance with known techniques so as to be flush with the surface of the main body or can be raised/protruding outward from the main body so as to give a three dimensional effect.

As described herein, the above described inside and outside facing surfaces 11a and 11b refer to the visible portion of the vest while it is being worn by the pet. In this regard, the vest is preferably constructed so as to be reversible in nature. To this end, each of these surfaces 11a and 11b can include identical or different decorative markings A and B, and can be worn on the pet with either surface 11a or 11b facing outward.

In one embodiment, the vest can further include a plurality of light strips 21 comprising multiple individual lighted elements such as LED's for example. These light strips can be disposed along the main body, the collar, the middle support and/or the elastomeric leg loops at any orientation, and can function to illuminate the vest and pet as described below. As such, each of the light strips can generate any number of different colors at the same or varying intensities, and can also perform any type of lighting effect such as remaining illuminated, flashing, and/or performing a unique or synchronized chasing pattern.

Although described above as including light strips, this is but one possible implementation, as other embodiments are contemplated wherein individual lighted elements can be disposed along or within the vest and are not tied directly to a light strip. Moreover, the lighting elements are not limited to the use of LED's, as any type of device capable of generating light as described herein can also be utilized.

FIG. 3 illustrates one embodiment of a control unit 30 which can function to control the light strips. As shown, the control unit can include an enclosure 30a that houses a processor 31 that is conventionally connected to an internal memory 32, a timer module 33, a communication unit 34, and a power module 35.

The enclosure 30a can house each of the elements in a conventional manner, so as to create a single device. In this regard, the enclosure 30a can take any number of different shapes and sizes, and can be constructed from any number of different materials and methods. In one preferred embodiment, the enclosure 30a can be constructed from lightweight injection molded plastic having a plurality of internal connectors (not shown) for securely housing each of the device elements. The housing can preferably be positioned within a pocket 18 located along the inside facing portion of the main body 11b. Each of the lighted strips 21 can be physically connected to the control unit 30 via cables 19 that are located between body portions 11a and 11b.

Although illustrated as separate elements, those of skill in the art will recognize that one or more system components may be, or include one or more printed circuit boards (PCB) containing an integrated circuit or circuits for completing the activities described herein. The CPU may be one or more integrated circuits having firmware for causing the circuitry to complete the activities described herein.

The processor/CPU 31 can act to execute program code stored in the memory 32 in order to allow the device to perform the functionality described herein. Likewise, a timer module 33 can be provided and can function to accurately measure the passage of time. As described herein, the timer module can be provided as a function of the processor or can include a separate physical circuit. In either instance, processors and timers are extremely well known in the art, therefore no further description will be provided.

Memory 32 can act to store operating instructions in the form of program code for the processor 31 to execute. As described herein, memory can include one or more physical memory devices such as, for example, local memory and/or one or more bulk storage devices.

As will be described below, the processor, timer and memory can function to generate and send instructions to the light strips 21. These instructions can include the ability to selectively illuminate each individual lighting element of the light strips, so as to perform any type of illumination activity.

The communication unit 34 can act to receive a signal from an outside device, and more particularly the below described remote operation unit 40. In one embodiment, the communication unit can include a variable radio wave receiver having a unique radio frequency chip capable of receiving and translating a plurality of independent radio frequencies which can be sent to the processor 31 and/or the memory 32.

Although described above as using radio transmission, reception and frequencies, with a dedicated remote operation unit, other communication mediums and their associated components are also contemplated. To this end, the communication unit can also include a Bluetooth transceiver for communicating wirelessly with an external device such as a smartphone, computer and/or tablet device running an App. Such a feature can allow a single smartphone to simultaneously control the lighting effect of multiple vests at the same time. Of course, any number of other known transmission and reception mechanisms and protocols can also be utilized herein.

The power module 35 can function to provide the necessary power requirements to each element of the controller 30 and to each of the light strips 21. In one embodiment, the power module can comprise one or more lightweight coin-style DC batteries, which can be positioned within the controller body. Additionally, the power module can include or interface with a charging port such as a micro USB port for example. Such a feature can allow the batteries within the power module to be recharged.

The remote operation unit 40 can include a housing 41 having one or more user buttons 42 that transmit signals to the controller 30, in order to selectively activate the lighting elements, as described above. In the preferred embodiment, the unit 40 can be battery operated, and can include a range of between 30 and 100 yards, for example, however other ranges are contemplated.

FIG. 4 illustrates one embodiment of the safety vest 10 in operation. As shown, the vest can be secured about the neck, mid-section and/or hind legs of a dog 2, as described above. Once in position, the remote operation unit 40 can instruct the control unit to selectively activate the light strips 21, so as to provide any type of illumination effect.

Figure 5A:
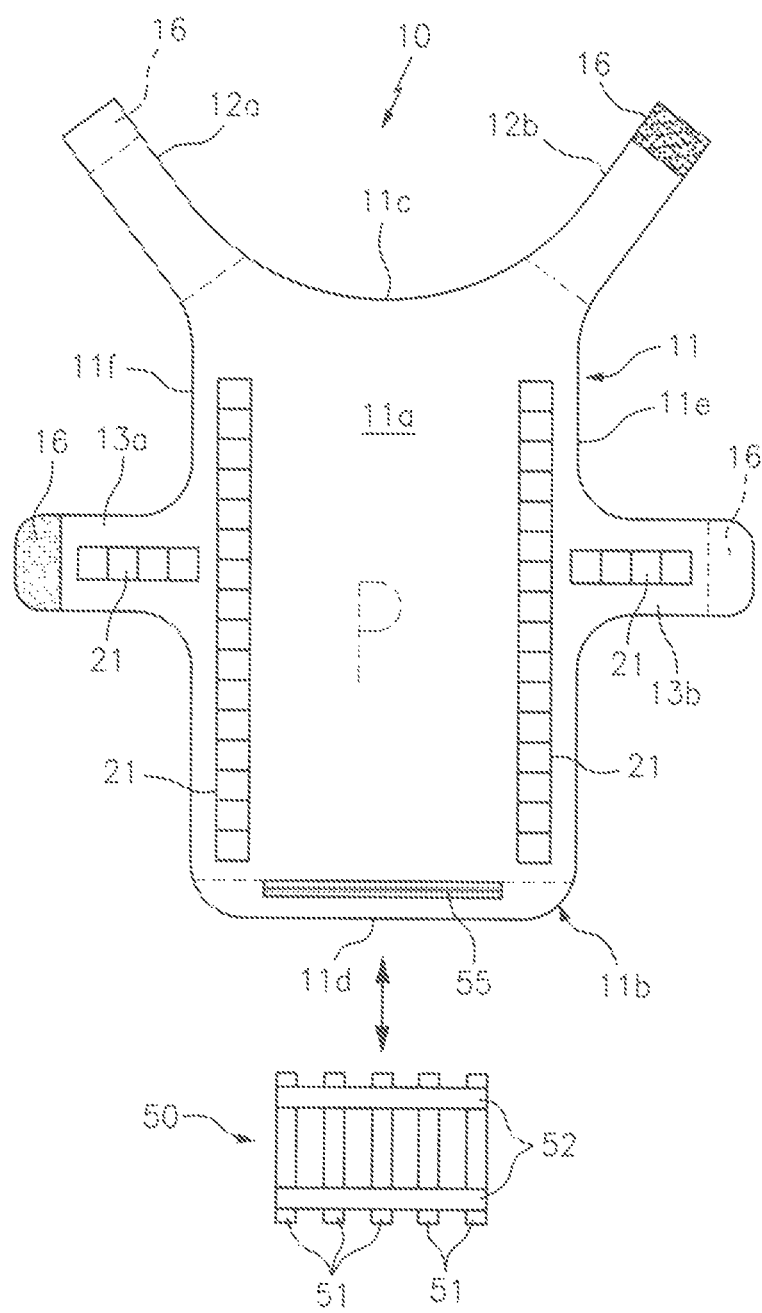
FIG. 5A is a plan view of an outside facing surface of the pet safety vest, in accordance with another embodiment of the invention.
Figure 5B:
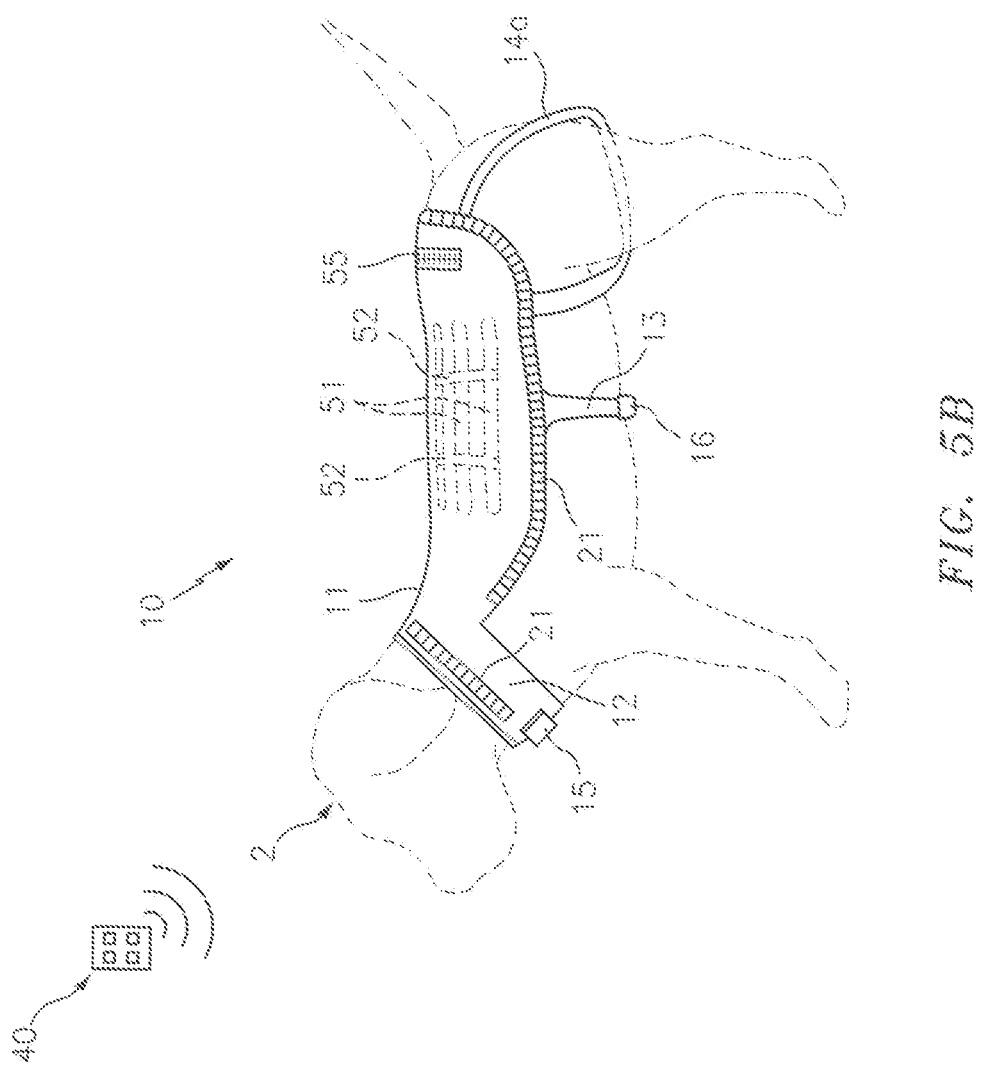
FIG. 5B is a perspective view of the of the pet safety vest in operation, in accordance with the other embodiment of the invention.

FIGS. 5A and 5B illustrate another embodiment of the safety vest 10 that further includes a removable cooling packet 50. As shown, the cooling packet can include a plurality of individual cooling tubes 51, that are bound together by flat straps 52 or other such retention members, so as to allow the tubes to contour about the back of the pet. Each of the tubes can house a coolant such as water or freezer gel, for example, that is suitable for being repeatedly frozen and thawed without causing harm to the tubes. Of course, any number of other commercially available freezer packs are also contemplated for use herein.

In the illustrated embodiment, a pocket P is formed within the main body between the inside and outside facing surfaces 11a and 11b, and is bound by ends 11c-11f. A zipper 55 or other such connector can be disposed along, or adjacent to the bottom end 11d of the main body so as to provide access to a pocket area P. As shown in FIG. 5B, once the cooling packet is inserted within the pocket P, the zipper can be closed, and the pack 50 can function to provide cooling comfort to the animal 2 wearing the vest.

Accordingly, the pet safety vest 10 provides a lightweight comfortable vest that can be worn by canines and other pets. The decorative elements help to quickly identify a particular pet during the day, and the lighted elements function to allow vehicles and other potential sources of danger to immediately observe the pet during the night.

As described herein, one or more elements of the pet safety vest 10 can be secured together utilizing any number of known attachment means. Moreover, although the above embodiments have been described as including separate individual elements, the inventive concepts disclosed herein are not so limiting. To this end, one of skill in the art will recognize that one or more individual elements such as the main body 11, collar sections 12a and 12b, middle support elements 13a and 13b, and/or the elastomeric leg loops 14a and 14b, for example, may be formed as either separate individual elements, or together as one continuous element, through known manufacturing processes.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A pet safety vest, comprising:
   a main body that includes an outside facing surface, an inside facing surface, a top end, a bottom end and a pair of sides;
   a first and second collar section that extend outward from the top end of the main body, each of the first and second collar sections including distal ends that are removably secured together via a first connector;
   one or more light strips that are disposed along the main body, each of the one or more lights strips include a plurality of LED's that are configured to generate a plurality of different colors;
   a remote operation unit that is configured to control an operation of the one or more light strips; and
   a control unit that is positioned within the main body, said control unit including:
   a processor that is in communication with the one or more light strips,
   a memory that is in communication with the processor,
   a power source that is configured to supply power to each of the one or more light strips, and
   a communication unit that is in communication with each of the processor and the remote operation unit.

2. The vest of claim 1, wherein the remote operation unit includes a main body and a plurality of push buttons, and
   wherein each of the plurality of buttons instructs the one or more light strips to perform a different lighting effect.

3. The vest of claim 1, further comprising:
   a middle support member that includes
   a first support element that extends outward from one of the pair of sides, and a second support element that extends outward from the other one of the pair of sides, each of the support elements including distal ends that are removably secured together via a second connector.

4. The vest of claim 3, wherein the first and second connectors include, at least one of, a clip, a buckle, opposing strips of hook and loop material, a snap, a button and opposing magnetic elements.

5. The vest of claim 3, further comprising:
a pair of elastomeric loops that are disposed along the inside facing surface of the main body at a location adjacent to the bottom end, each of said loops being configured to engage a hind leg of a pet wearing the vest.

6. The vest of claim 1, further comprising:
a leash attachment unit that is disposed along the outside facing surface of the main body, said leash attachment unit comprising a ring that is configured to engage a clasp of a pet leash.

7. The vest of claim 1, wherein the main body is reversible.

8. The vest of claim 7, further comprising decorative elements along each of the inside facing surface and the outside facing surface.

9. The vest of claim 8, wherein the vest includes different decorative elements along the inside facing surface and the outside facing surface.

10. The vest of claim 1, wherein the main body is constructed from a breathable and UV resistant material.

11. A pet safety vest, comprising:
a main body that includes an outside facing surface, an inside facing surface, a top end, a bottom end and a pair of sides that define an internal pocket area;
a zipper that is disposed along the main body, said zipper functioning to provide access to the internal pocket area;
a cooling packet that is removably secured within the internal pocket area;
a first and second collar section that extend outward from the top end of the main body, each of the first and second collar sections including distal ends that are removably secured together via a first connector;
one or more light strips that are disposed along the main body; and
a remote operation unit that is configured to control an operation of the one or more light strips,
wherein the main body is reversible.

12. The vest of claim 11, wherein the cooling unit comprises:
a plurality of elongated cooling tubes that filled with a freezable material; and
one or more straps that are secured to each of the cooling tubes, said straps being configured to allow the tubes to conform to a shape of an animal wearing the vest.

13. The vest of claim 11, wherein each of the one or more lights strips include a plurality of LED's that are configured to generate a plurality of different colors.

14. The vest of claim 13, further comprising:
a control unit that is positioned within the main body, said control unit including:
a processor that is in communication with the one or more light strips;
a memory that is in communication with the processor;
a power source that is configured to supply power to each of the one or more light strips; and
a communication unit that is in communication with each of the processor and the remote operation unit.

15. The vest of claim 14, wherein the remote operation unit includes a main body and a plurality of push buttons, and
wherein each of the plurality of buttons instructs the one or more light strips to perform a different lighting effect.

16. A pet safety vest, comprising:
a main body that includes an outside facing surface, an inside facing surface, a top end, a bottom end and a pair of sides;
a first and second collar section that extend outward from the top end of the main body, each of the first and second collar sections including distal ends that are removably secured together via a first connector;
one or more light strips that are disposed along the main body; and
a remote operation unit that is configured to control an operation of the one or more light strips,
wherein the main body is reversible and further includes a plurality of decorative elements along each of the inside facing surface and the outside facing surface thereof.

* * * * *